United States Patent [19]

Boeckmann

[11] Patent Number: 4,591,666
[45] Date of Patent: May 27, 1986

[54] PROTECTION CIRCUITRY FOR SUBSCRIBER'S TELEPHONE CIRCUIT EQUIPPED WITH REPERTORY MEMORY

[75] Inventor: Eduard F. B. Boeckmann, Huntsville, Ala.

[73] Assignee: GTE Business Communication Systems Inc., Northlake, Ill.

[21] Appl. No.: 558,129

[22] Filed: Dec. 5, 1983

[51] Int. Cl.[4] .......................................... H04M 1/274
[52] U.S. Cl. .............................. 179/90 B; 179/90 BB; 179/90 BD
[58] Field of Search ........... 179/90 B, 90 BB, 90 BD, 179/90 K, 90 R, 81 R, 2 BC

[56] References Cited

U.S. PATENT DOCUMENTS

| | | | |
|---|---|---|---|
| 4,171,469 | 10/1979 | Brooks | 179/18 BA |
| 4,232,200 | 11/1980 | Hestad et al. | 179/90 K |
| 4,324,954 | 4/1982 | Taylor | 179/90 B |
| 4,475,013 | 10/1984 | Lee et al. | 179/90 BD |
| 4,492,820 | 1/1985 | Kennard et al. | 179/5 P |
| 4,503,291 | 3/1985 | Von Holten et al. | 179/90 AN |

*Primary Examiner*—Gene Z. Rubinson
*Assistant Examiner*—Robert G. Lev
*Attorney, Agent, or Firm*—Robert J. Black; Gregory G. Hendricks

[57] ABSTRACT

A protective circuit for use in a subscriber's telephone circuit that includes a repertory memory and includes a battery which provides memory retention current. Circuitry permits the battery to be protected by a series current limiting resistor while maintaining sufficient voltage so that the memory maintains its integrity.

1 Claim, 1 Drawing Figure

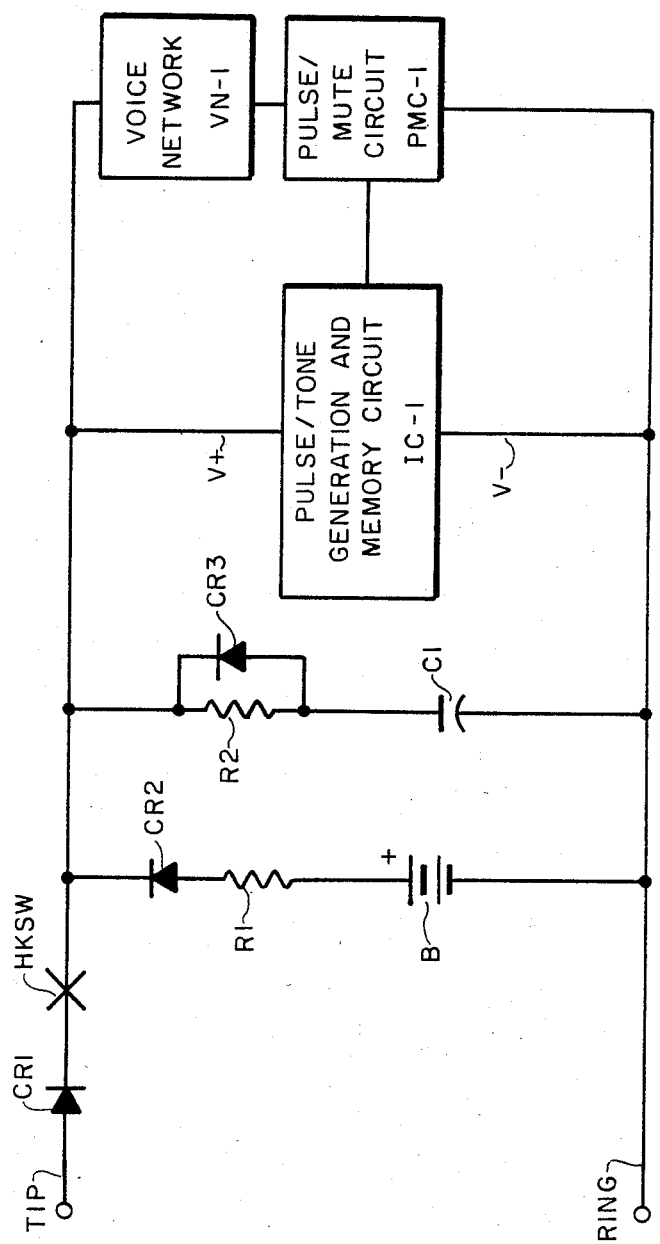

PROTECTION CIRCUITRY FOR SUBSCRIBER'S TELEPHONE CIRCUIT EQUIPPED WITH REPERTORY MEMORY

BACKGROUND OF THE INVENTION

1. Technical Field

The present invention relates to a subscriber's telephone circuit equipped with a repertory memory powered from a self-contained battery, and more particularly to circuitry to protect such a battery while maintaining sufficient voltage to maintain the information stored in the memory.

2. Background Art

With the introduction of electronic telephones, it has become not only feasible but common to provide repertory memory dialing functions with the ability to store, recall and automatically dial out telephone numbers of fifteen or more digits. In such an arrangement, usually ten or more memory registers, each capable of storing a complete sequence are provided using integrated circuits, such as the MOSTEK MK-50981 and MK-5175 integrated circuit units, that contain the necessary memory registers and control functions. The memories contained in such integrated circuits are usually of the volatile type and require constant external current to maintain information stored in the memory. A number of methods are employed for such maintenance of information in the memory during such time as the telephone is in the "on-hook" condition. Such methods include the utilization of a long life non-customer replaceable battery, the use of a customer replaceable battery, connection to an external power supply from a 110 volt AC line, or the powering of the memory unit from the telephone line by means of utilization of a high value resistor (10 megohms or greater) to drain a few microamps from the telephone line. Only the use of batteries have the potential for maintaining the memory continuously without interruption by telephone line voltage transients or power outages.

Even with the utilization of a long life noncustomer replaceable battery, subscribers have often become dissatisfied due to an unexplainable loss of memory of a temporary nature, thus requiring restoring all of the information lost. Usually when such a memory loss occurs, all of the stored numbers are lost and must be reentered and thus restored to return the telephone to the repertory mode of operation. The major cause of such memory loss is due to transients in the memory power supply circuit which caused the memory retention current to drop below the necessary threshhold to maintain retention. Such transients can be produced by the telephone dial pulses from a key controlled pulse generator which is not adequately decoupled from the memory circuit. It is also possible for external transients on the telephone line to cause the memory retention current to drop below the aforementioned threshhold.

Where the memory circuitry is powered from the telephone line directly, employing a high value resistor, only a capacitor is used to store a charge on the pulse generator circuitry. This simple arrangement is quite satisfactory for dial pulse only circuits, but is completely unsatisfactory for some dual tone multifrequency circuits due to the shunting effect on dual tone multifrequency toning levels. Accordingly, it is the object of the present invention to provide a new and useful protective circuit for repertory memories as employed in telephone subscriber circuits, which function with both dial pulse and dual tone multifrequency integrated circuits and with so-called combination dial pulse and dual tone multi-frequency circuits.

SUMMARY OF THE INVENTION

The present invention consists of an electronic telephone, including a pulse and tone generator and memory circuit in integrated circuit form. It should be understood, of course, that it could be a pulse generation or tone generation circuit instead of a combination circuit. Connected to the output of the pulse and tone generator memory circuit is a conventional voice network connected to a pulse mute circuit as may be found in the state of the art electronic telephones. The combination pulse/tone generation and memory circuit and voice network are also both connected to a telephone line consisting of the usual T and R conductors which extend to a telephone central office or private branch exchange. Also included in forming the basis of the present invention is a capacitor for energy storage, a resistor which permits rapid charging of the capacitor while maintaining a sufficiently high AC impedance for the circuit, both of which are connected in series across the conductors of the telephone line, and a diode connected in parallel with the resistor which allows rapid transfer of the charge from the capacitor to oppose negative transients. The present circuitry is arranged so that the capacitor charges from the positive voltage supply to the negative supply of the dialing/tone integrated circuit through a suitable resistance as described above. Charge remains on the capacitor unless the diode becomes forward biased due to a negative transient appearing on the positive voltage supply line. At the occurrence of the negative transient on the positive voltage supply line, which would normally cause a loss of memory, if the transient is sufficient to cause a voltage drop of more than approximately one volt below the voltage charge level on the capacitor, the diode then becomes rapidly conductive and permits the capacitor to supply energy to the positive voltage supply line thus opposing the transient.

BRIEF DESCRIPTION OF THE DRAWING

The single FIGURE of the attached drawing comprises a simplified block and schematic diagram of a subscriber's telephone circuit, including a combination pulse and tone generator circuit with auxiliary circuitry providing protection against loss of battery supply to an included repertory memory resulting from transients in the memory power supply circuit to cause the memory retention current to drop below the retention threshhold.

DESCRIPTION OF THE PREFERRED EMBODIMENT

Referring now to the accompanying drawing, a subscriber's telephone circuit adapted for connection via leads T and R for telephone central office or private branch exchange is shown. Connected to the telephone line are a voice network VN-1 and a pulse/mute circuit PMC-1, both of which employ circuitry well known in the prior art and do not form a portion of the present invention. Also included is a pulse/tone generation integrated circuit with memory capability IC-1. This circuit is also connected across the telephone line (to conductors T and R) and includes an output circuit that extends through the pulse/mute circuit PMC-1 to the voice network VN-1. Also included are a battery supply circuit and memory protect circuit. Connection to the telephone line via the tip or T conductor is made through a hookswitch (HKSW) shown in its operate or off-hook position. Not shown for simplicity are the usual polarity guard, a keying device, which would normally be connected to the integrated circuit IC-1, and other circuit protection and features of telephones, such as a ringer, etc.

Lines T and R represent the telephone line tip and ring. Diode CR1 acts to block current from the included battery B from flowing on to the telephone line. Diode CR2 prevents charging of the battery, if such battery is of the non-chargeable type. If the battery is of the chargeable type, diode CR2 would not be present. Resistor R1, in series with diode CR2 and the battery providing the power supply for the pulse tone generation and memory circuit IC-1, is a current limiting resistor to prevent battery surges. Battery B provides current to the integrated circuit for memory retention during on-hook times and for line current interruption back-up. Resistor R2 permits charging of capacitor C1 but provides sufficient impedance limitation to prevent alternating current shunting during tone generation and for audio signals. Diode CR3 permits energy to be dumped rapidly from capacitor C1 if the positive voltage on the pulse/tone generator IC-1 drops below the charge level on capacitor C1 less the forward voltage drop from diode CR3. This provides a major feature of the present memory protect circuitry in that negative transients on the positive voltage input of the pulse/tone generator circuit IC-1 are opposed by action of diode CR3 and capacitor C1.

In operation, battery B provides current to to pulse/tone generator integrated circuit IC-1 when the hookswitch is open (the on-hook mode) through resistor R1 and diode CR2 with capacitor C1 charging to or stabilizing to the voltage of battery B. Any transients appearing on the positive voltage line in excess of approximately one volt will be opposed by capacitor C1 discharging through diode CR3. In the off-hook mode battery current is blocked by diode CR2 on short loop conditions, but capacitor C1 charges to the tip voltage. Again, any transients going negative by more than one volt relative to the voltage charge on capacitor C1 will be opposed by capacitor C1 discharging. If diode CR3 is of the Schottky type, then opposition to negative transients will start at approximately 0.4 volts below the charge on capacitor C1. On long telephone loops, current supplied to integrated circuit IC-1 may be a combination of telephone line current and current from battery B if diode CR2 is forward biased, but the operation of capacitor C1 and diode CR3 will still oppose any negative transients. The use of a Schottky diode for diode CR3 will also improve response time in opposition to such transients.

In summary, passive resistor R2, diode CR3 and capacitor C1 form a network which opposes negative transients in the circuit which would otherwise interfere with memory retention. As indicated previously, the memory protection circuit is suitable for use in combination dial pulse and dual tone multi-frequency instruments having repertory or redial memory functions. Likewise, the memory protection circuit is usable for those circuits that have dial pulse or dual tone multi-frequency telephone circuits with repertory or redial memory functions. The circuitry is intended for use on those telephone instruments which require battery back-up for memory retention and where battery current limiting resistance is employed to extend the battery life. Thus, the present memory protection circuit finds itself suitable for usage in many currently marketed subscriber's telephone where a need exists to prevent negative transients on the memory retention supply where such transients are of a high speed nature and the circuit is remote from the main source of voltage supply or in those situations where supply current limiting is employed.

While but a single embodiment of the present invention has been shown, it will be obvious to those skilled in the art that numerous modifications may be made without departing from the spirit of the present invention which shall be limited only by the scope of the claims appended hereto.

I claim:

1. A subscriber's telephone circuit connected to a telephone line and including: memory means including calling signal information stored therein, connected to said telephone line;
    a battery connected to said memory means providing current to maintain information stored in said memory means, during the on-hook condition of said telephone circuit and to provide back-up for interruption in line current received over said telephone line;
    a capacitor connected to said battery and including circuit connections to said memory means, said capacitor charged from said battery to oppose transients occurring on said circuit connections to said memory means and thereby maintain the integrity of said calling signal information stored in said memory means; a resistor in series with said capacitor limiting the impedance of said charging circuit; a diode in parallel with said resistor permitting the flow of energy out of said capacitor in opposition to transients occurring on said circuit connection to said memory means; and there is further included a current limiting resistor in series with said battery to prevent battery surges.

* * * * *